US011783111B2

(12) United States Patent
Jiang et al.

(10) Patent No.: US 11,783,111 B2
(45) Date of Patent: Oct. 10, 2023

(54) DISPLAY METHOD AND APPARATUS, AND ELECTRONIC DEVICE

(71) Applicant: BEIJING BYTEDANCE NETWORK TECHNOLOGY CO., LTD., Beijing (CN)

(72) Inventors: Qian Jiang, Shenzhen (CN); Hongxiao Xin, Shenzhen (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/877,992

(22) Filed: Jul. 31, 2022

(65) Prior Publication Data
US 2022/0366124 A1 Nov. 17, 2022

Related U.S. Application Data

(63) Continuation of application No. PCT/CN2021/092336, filed on May 8, 2021.

(30) Foreign Application Priority Data

May 8, 2020 (CN) .......................... 202010384779.7

(51) Int. Cl.
*G06F 17/00* (2019.01)
*G06F 40/103* (2020.01)
*G06F 3/14* (2006.01)

(52) U.S. Cl.
CPC .............. *G06F 40/103* (2020.01); *G06F 3/14* (2013.01)

(58) Field of Classification Search
CPC .................................. G06F 40/103; G06F 3/14
See application file for complete search history.

(56) References Cited

U.S. PATENT DOCUMENTS 6,230,170 B1 * 5/2001 Zellweger ............. G06F 40/131
345/646
8,190,990 B2 * 5/2012 Le ........................ G06F 16/9558
715/233

(Continued)

FOREIGN PATENT DOCUMENTS

CN 107038253 A 8/2017
CN 107145513 A 9/2017

(Continued)

OTHER PUBLICATIONS

International Search Report dated Aug. 5, 2021 in International Application No. PCT/CN2021/092336.

*Primary Examiner* — Mohammed H Zuberi

(57) ABSTRACT

A display method and apparatus, and an electronic device are provided, the method includes: displaying a browsing object in a first region, wherein the first region displays on a online documentation; determining, in response to an instruction to display a comment for the browsing object, a display structure of a comment layer based on a predefined display parameter of the comment for the browsing object, wherein the predefined display parameter is configured to indicate a size of a second region in which the comment layer is located; and generating the comment layer based on the determined display structure, and displaying the comment in the generated comment layer, wherein a range of the second region is smaller than a range of the first region in a first direction or a second direction.

18 Claims, 9 Drawing Sheets

(56) References Cited

U.S. PATENT DOCUMENTS

| | | | |
|---|---|---|---|
| 10,031,903 B2 * | 7/2018 | Haynes, II | G06Q 30/0201 |
| 10,042,832 B1 * | 8/2018 | Vagell | G06F 40/103 |
| 10,360,257 B2 * | 7/2019 | Hou | G06F 16/58 |
| 10,394,945 B2 * | 8/2019 | Hsu | G06F 16/00 |
| 2002/0010707 A1 * | 1/2002 | Chang | G06F 40/103 |
| | | | 715/205 |
| 2010/0131836 A1 * | 5/2010 | Dukhon | G06F 40/169 |
| | | | 715/230 |
| 2011/0066957 A1 * | 3/2011 | Prats | G06F 40/103 |
| | | | 709/204 |
| 2014/0289611 A1 * | 9/2014 | Norwood | G06F 16/958 |
| | | | 715/753 |
| 2015/0033109 A1 * | 1/2015 | Marek | G06F 16/438 |
| | | | 715/230 |
| 2015/0067469 A1 * | 3/2015 | Shuto | G06F 40/169 |
| | | | 715/232 |
| 2015/0156147 A1 * | 6/2015 | Liu | G06F 3/04842 |
| | | | 715/753 |
| 2016/0034439 A1 * | 2/2016 | Scheers | G06T 11/60 |
| | | | 715/232 |
| 2019/0034441 A1 * | 1/2019 | Capon | G06F 40/143 |
| 2019/0082214 A1 | 3/2019 | Kim et al. | |
| 2020/0042584 A1 * | 2/2020 | Vennix | G06F 40/103 |
| 2020/0371757 A1 * | 11/2020 | Shukla | G06F 16/907 |

FOREIGN PATENT DOCUMENTS

| | | |
|---|---|---|
| CN | 108093306 A | 5/2018 |
| CN | 110069620 A | 7/2019 |
| CN | 110188298 A | 8/2019 |
| CN | 110764668 A | 2/2020 |
| CN | 111597467 A | 8/2020 |

\* cited by examiner

DISPLAY METHOD AND APPARATUS, AND ELECTRONIC DEVICE

CROSS-REFERENCE TO RELATED APPLICATION

The present application is a continuation application of International Application No. PCT/CN2021/092336, titled "DISPLAY METHOD AND APPARATUS, AND ELECTRONIC DEVICE", filed on May 8, 2021, which claims priority to Chinese Patent Application No. 202010384779.7, titled "DISPLAY METHOD AND APPARATUS, AND ELECTRONIC DEVICE", filed on May 8, 2020, both of which are incorporated herein by reference in their entireties.

FIELD

The present disclosure relates to the field of internet technologies, and in particular to a display method, a display apparatus, and an electronic device.

BACKGROUND

With the development of the internet, users are increasingly browsing various types of information by using terminal devices. For example, user A can browse various documents by using the terminal device. Some comments made by other users on the document may have been recorded in the above documents. The user A may be interested in the comments of other users and wishes to view the comments of other users. In some application scenarios, the user A may wish to post his own comments on the above documents.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

A display method, a display apparatus, and an electronic device are provided according to the embodiments of the present disclosure.

In a first aspect, a display method is provided according to an embodiment of the present disclosure. The method includes: displaying a browsing object in a first region; determining, in response to an instruction to display a comment for the browsing object, a display structure of a comment layer based on a predefined display parameter of the comment for the browsing object, where the predefined display parameter is configured to indicate a size of a second region in which the comment layer is located; and generating the comment layer based on the determined display structure, and displaying the comment in the generated comment layer, where the second region overlaps with the first region, and a range of the second region is smaller than a range of the first region in a first direction or a second direction.

In a second aspect, a display apparatus is provided according to an embodiment of the present disclosure. The apparatus includes: a first display unit configured to display a browsing object in a first region; a first determination unit configured to determine, in response to an instruction to display a comment for the browsing object, a display structure of a comment layer based on a predefined display parameter of the comment for the browsing object, where the predefined display parameter is configured to indicate a size of a second region in which the comment layer is located; and a second display unit configured to generate the comment layer based on the determined display structure, and display the comment in the generated comment layer, where the second region overlaps with the first region, and a range of the second region is smaller than a range of the first region in a first direction or a second direction.

In a third aspect, an electronic device is provided according to an embodiment of the present disclosure. The electronic device includes: one or more processors; and a storage apparatus storing one or more programs, where the one or more programs, when executed by the one or more processors, cause the one or more processors to perform the display method according the first aspect.

In a fourth aspect. A computer-readable medium storing a computer program is provided according to an embodiment of the present disclosure, the program, when executed by a processor, implementing steps of the display method according the first aspect.

With the display method, the display apparatus, and the electronic device according to the embodiments of the present disclosure, when displaying a browsing object, it is determined whether to display a comment for the browsing object; if it is determined to display the comment for the browsing object, a display structure of a comment layer is determined based on a predefined display parameter of the comment for the browsing object; then, the comment layer is generated based on the determined display structure, and the comment is displayed in the generated comment layer. In this way, the comment layer for the browsing object is generated according to the actual situation indicated by the predefined display parameter of the comment for the browsing object, that is, the display structure of the generated comment layer matches the predefined display parameter. It should be understood that comment layers of different display structures are generated while consuming different computing resources, and display information in different manners. The information need to be displayed in a manner that meets actual display requirements, while computing resources consumed during generation need to be reduced to the greatest extent. The display structure determined based on the predefined display parameter is generated according to the actual display requirements, which can not only meet the practical needs, but also avoid wasting computing resources, thereby balancing the satisfaction of the actual display requirements and the amount of calculation, and saving the computing resources to the greatest extent. In contrast, if a unified comment layer is generated without determining the display structure based on the predefined display parameter, computing resources or display resources may be wasted.

It is to be noted that, the browsing object is displayed in the first region, and the comment is displayed in the second region, the second region overlaps with the first region, and the range of the second region is smaller than the range of the first region in the first direction or the second direction, which can ensure that the browsing object is displayed while displaying the comment. In this way, the user can see the browsing object while viewing the comment, and can see the browsing object and the comment in the same interface without having to switch between the comment and the browsing object. In this way, utilization of the screen (that displays the comment and the browsing object) can be improved, and operations performed by the user for viewing the comment and the browsing object are reduced, thereby reducing the amount of calculation and screen refresh of the executive body due to the user viewing the comment and the browsing object, that is, computing resources and the power of the executive body are saved.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

DESCRIPTION OF EMBODIMENTS

Figure 1:
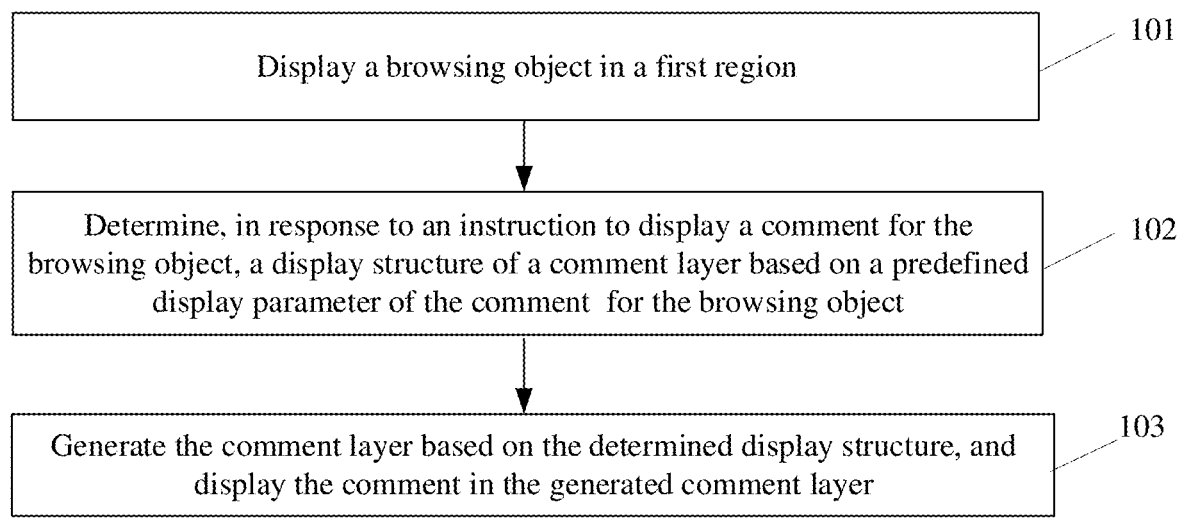
FIG. 1 is a flowchart of a display method according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Instead, the embodiments are provided for the purpose of a more thorough and complete understanding of the present disclosure. It should be understood that the drawings and embodiments of the present disclosure are only for exemplary purposes, and are not intended to limit the scope of the present disclosure.

It should be understood that the various steps described in the method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof are open-ended inclusions, that is, "including but not limited to". The term "based on" means "based at least in part on." The term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless the context clearly indicates otherwise, they should be understood as "one or multiple".

The names of messages or information exchanged between multiple devices in the embodiments of the present disclosure are only for illustrative purposes, and are not intended to limit the scope of these messages or information.

Reference is made to FIG. 1, which shows a flow a display method according to an embodiment of the present disclosure. As shown in FIG. 1, the display method includes the following steps 101 to 103.

In step 101, a browsing object is displayed in a first region.

In this embodiment, an execution body (for example, a terminal device) of the display method may display the browsing object in the first region.

Here, the above first region may be an entire display region or a part of the display region of a screen of the above execution body.

In this embodiment, the above browsing object may be any type of information available for browsing. For example, the above browsing object may include, but is not limited to, at least one of: a document, a web page, a presentation, and the like.

In some embodiments, the above browsing object may be an online document that may be browsed online.

In some application scenarios, the above browsing object may be displayed in response to a user triggering a browsing object display control.

In step 102, in response to an instruction to display a comment for the browsing object, a display structure of a comment layer is determined based on a predefined display parameter of the comment for the browsing object.

In this embodiment, the above execution body may determine the display structure of the comment layer based on the predefined display parameter of the comment for the browsing object in response to the instruction to display the comment for the browsing object.

Here, the above predefined display parameter may be configured to indicate a size of the second region in which the comment layer is located. In other words, the above predefined display parameter may be used to indicate the size of the second region. The type of the predefined display parameter may be set according to actual situations, and is not limited here. For example, the number of the comment may be used as the predefined display parameter.

It is to be noted that the predefined display parameter may be correlated to the size of the second region, and in general, the predefined display parameter may be positively correlated with the size of the second region.

Here, the display region of the above comment layer may be referred to as the second region. The size of the second region may be expressed in different manners according to the shape of the second region. For example, if the second region is a circle, the size of the second region may be expressed by a radius of the circle; if the second region is a rectangle, the size of the second region may be expressed by a length and a width of the rectangle. In this embodiment, the above execution body may preset a comment display condition, and determine to display the comment for the browsing object if the comment display condition is satisfied. For example, a comment reminder control may be configured, and in response to detection that the comment reminder control is triggered, the comment display condition is met, and the above execution body determines to display the comment for the browsing object. The above execution body determines to display the comment for the browsing object, and may generate an instruction to display the message for the browsing object.

Here, the second region overlaps with the first region, and a range of the second region is smaller than a region of the first region in a first direction or a second direction. In other words, the above comment layer may be configured to display the comment without completely occluding the browsing object.

Here, the above first direction may be any direction. For example, the first direction may be parallel to a length direction of the display screen. The second direction may be any direction different from the first direction. For example, the second direction may be parallel to a width direction of the display screen. It should be understood that, in general, a display screen of an electronic device is a rectangle that has a length direction and a width direction. In some application scenarios, the user may comment on the browsing object, and publish a comment for the browsing object. The above comment may be for the entire browsing object, or may be for a part of content of the browsing object. If the comment is for a part of content of the browsing object, this part of content may be referred to as commented content. In this embodiment, the browsing object may be stored in association with the predefined display parameter of the comment.

In this embodiment, a type of the display structure of the comment layer may be predefined. The above execution body may select a display structure suitable for the predefined display parameter of the comment from multiple predefined display structures according to the predefined display parameter of the comment.

In this embodiment, the display structure of the comment layer may include, but is not limited to, at least one of the following: a size of the comment layer, a color of the comment layer, whether the comment layer is capable of responding to a user operation, and the like.

In this embodiment, one or more comments may be displayed in the comment layer.

It should be understood that the comment layer may not completely occlude the browsing object, and may include not occluding or partially occluding the browsing object. In other words, the user can see a part the browsing object or the entire browsing object through the comment layer.

In step 103, the comment layer is generated based on the determined display structure, and the comment is displayed in the generated comment layer.

In this embodiment, the above execution body may generate the comment layer based on the determined display structure, and display the comment in the generated comment layer.

For example, if the determined display structure indicates that the size of the comment layer is A, a comment layer having the size A is generated, and the comment is displayed in the comment layer.

In some application scenarios, whether the comment layer responds to a user operation is not limited, and whether a region of the browsing object (that is, the first region) which is occluded or not occluded by the comment layer after the comment layer is displayed responds to a user operation is not limited.

It is to be noted that, with the display method according to the embodiments of the present disclosure, when displaying a browsing object, it is determined whether to display a comment for the browsing object; if it is determined to display the comment for the browsing object, a display structure of a comment layer is determined based on a predefined display parameter of the comment for the browsing object; then, the comment layer is generated based on the determined display structure, and the comment is displayed in the generated comment layer. In this way, the comment layer for the browsing object is generated according to the actual situation indicated by the predefined display parameter of the comment for the browsing object, that is, the display structure of the generated comment layer matches the predefined display parameter. It should be understood that comment layers of different display structures are generated while consuming different computing resources, and display information in different manners. The information need to be displayed in a manner that meets actual display requirements, while computing resources consumed during generation need to be reduced to the greatest extent. The display structure determined based on the predefined display parameter is generated according to the actual display requirements, which can not only meet the practical needs, but also avoid wasting computing resources, thereby balancing the satisfaction of the actual display requirements and the amount of calculation, and saving the computing resources to the greatest extent. In contrast, if a unified comment layer is generated without determining the display structure based on the predefined display parameter, computing resources or display resources may be wasted.

It is to be noted that, the browsing object is displayed in a first region, and the comment is displayed in a second region, the second region overlaps with the first region, and a range of the second region is smaller than a range of the first region in a first direction or a second direction, which can ensure that the browsing object is displayed while displaying the comment. In this way, the user can see the browsing object while viewing the comment, and can see the browsing object and the comment in the same interface without having to switching between the comment and the browsing object. In this way, utilization of the screen (that displays the comment and the browsing object) can be improved, and operations performed by the user for viewing the comment and the browsing object are reduced, thereby reducing the amount of calculation and screen refresh of the executive body due to the user viewing the comment and the browsing object, that is, computing resources and the power of the executive body are saved.

Figure 2A:
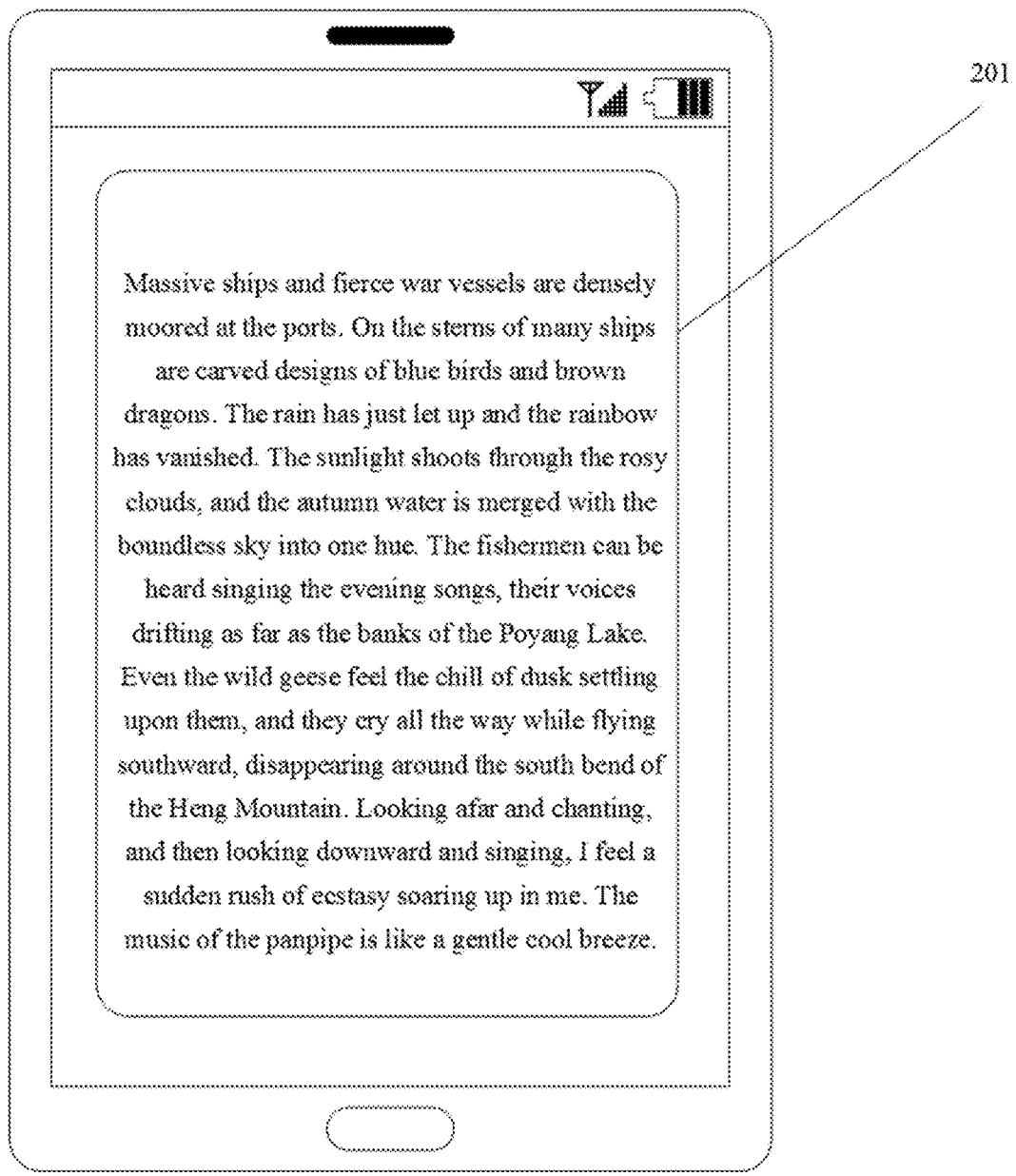
FIGS. 2A, 2B and 2C are schematic diagrams of an application scenario of the display method according to the present disclosure.
Figure 2B:
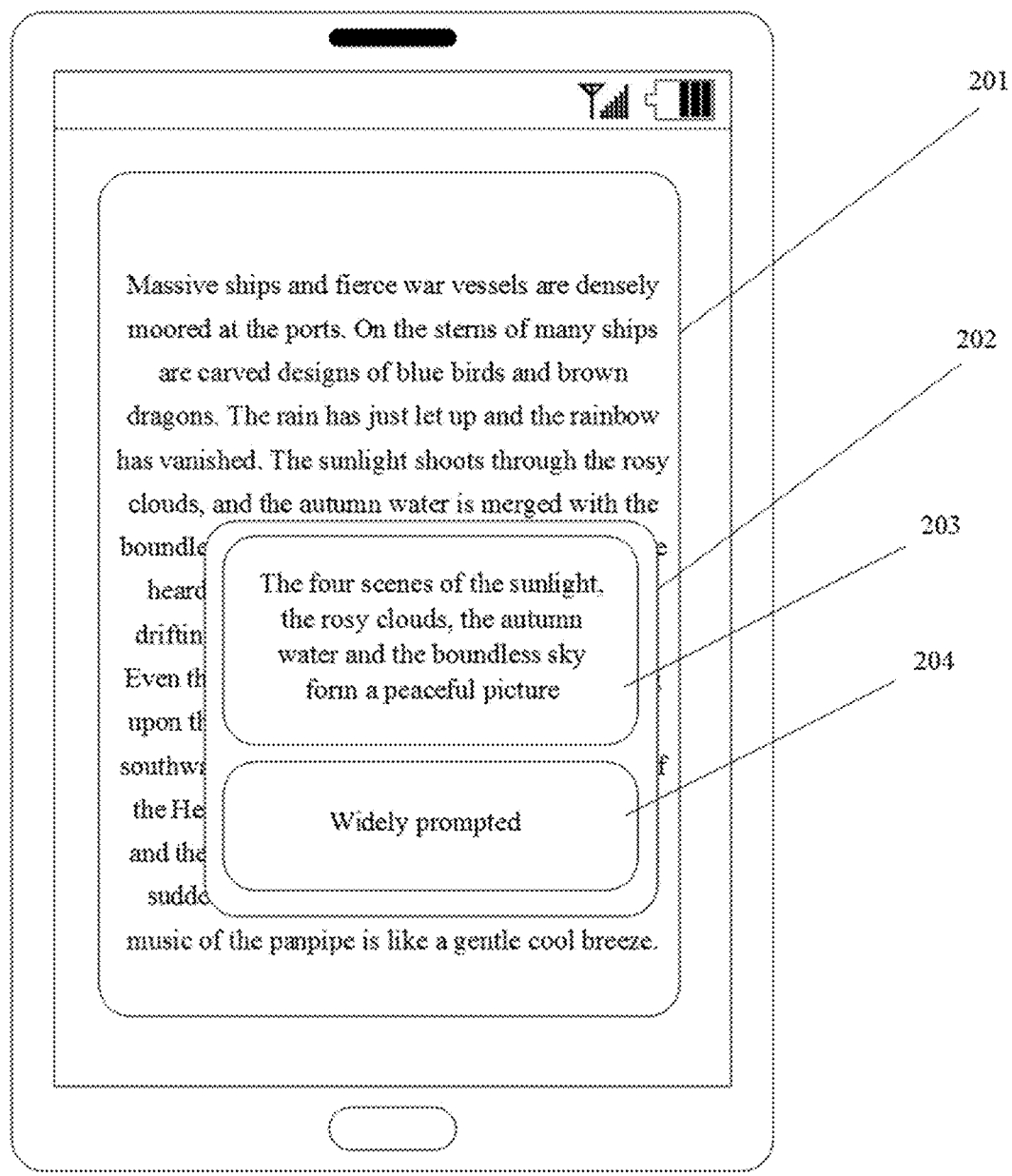
Figure 2C:
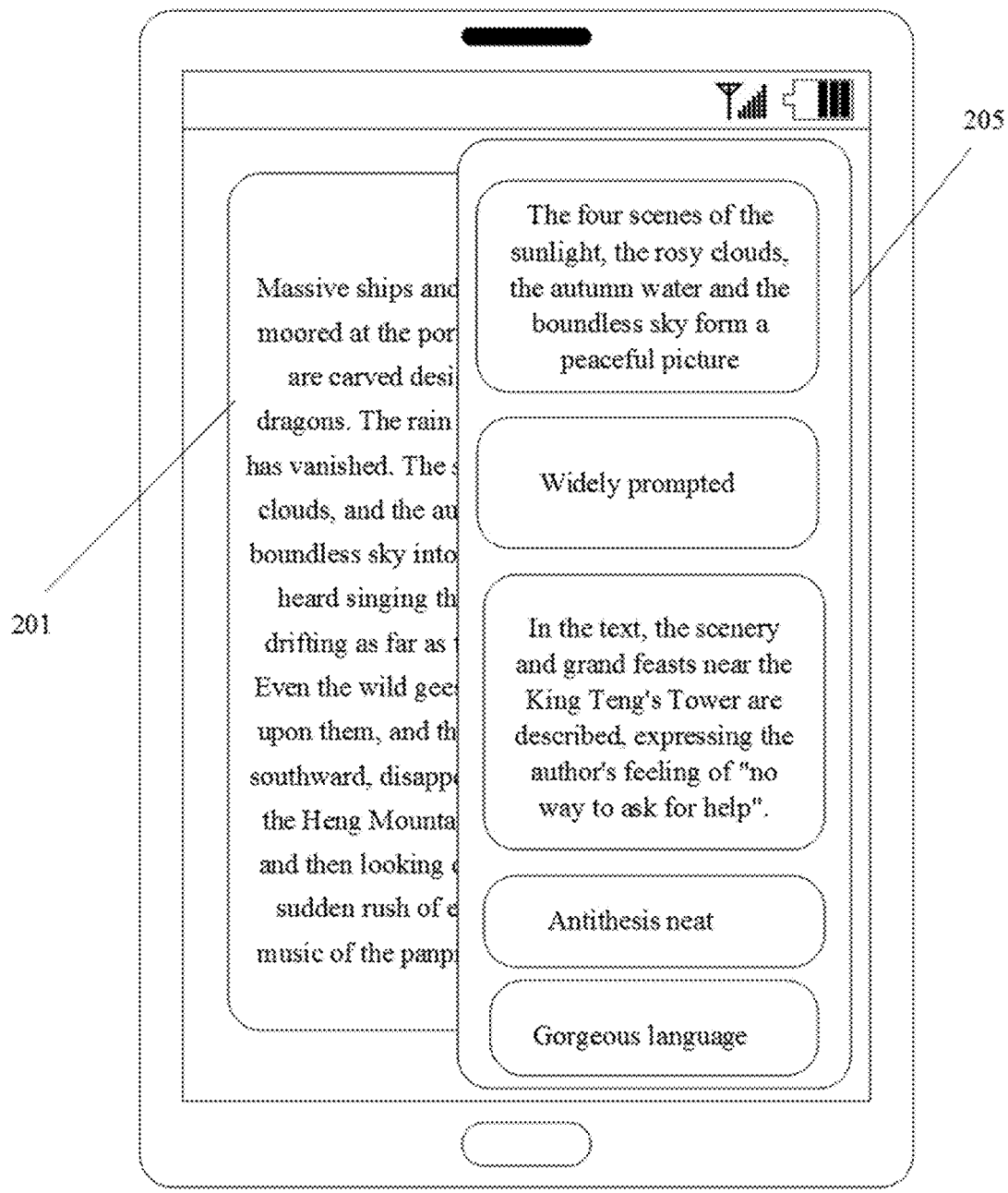

Reference is made to FIGS. 2A, 2B and 2C, which illustrate an exemplary application scenario of the embodiment shown in FIG. 1.

First, in FIG. 2A, the terminal may display a browsing object 201. For example, the browsing object 201 may be "A Tribute to King Teng's Tower", and a part of the browsing object is displayed.

Then, the terminal may determine whether to display a comment for the browsing object. If it is determined to display the comment for the browsing object, a display structure of a comment layer is determined based on a predefined display parameter of the comment for the browsing object (for example, the number or a height value of the comment).

Finally, the terminal may generate the comment layer based on the determined display structure, and display the comment in the generated comment layer. For example, reference is made to FIG. 2B, which shows comments 203 and 204 displayed in a comment layer 202. Reference is made to FIG. 2C, which shows comments displayed in another comment layer 205. It is to be noted that the multiple comments displayed in the comment layer 205 are not numbered one by one here.

In some embodiments, the above predefined display parameter may include a height value of the comment. It should be understood that comments having the same width and different numbers of words have different height values.

In some embodiments, the above step 102 may include: obtaining a height value of each of the comment for the browsing object, obtaining a height parameter value based on the height value; and determining the display structure of the comment layer based on the height parameter value and a preset height threshold.

Here, the height parameter value may be obtained based the height value according to the actual situation. For example, a sum of the height value may be used as the height parameter value; a sum of height values and a sum of gaps between adjacent comments may be used as the height parameter value. It should be understood that there may be a gap between adjacent comments, and an amount of the gap may be preset.

In some embodiments, the determining the display structure of the comment layer based on the height parameter value and the preset height threshold value may include: in response to determination that the height parameter value is not greater than the height threshold, determining the height value of the comment layer based on the height parameter value.

It is to be noted that, if the height parameter value is not greater than the height threshold, the area of the screen occupied by displaying the comment may be small, that is, in a case that the area required for displaying the comment is small, a comment layer having a smaller size is generated. Therefore, while ensuring that the comment can be displayed completely, the screen area occupied by the comment can be reduced, thereby improving the utilization of the screen, and reducing resources consumed by screen refresh (a smaller second region for displaying the comment corresponds to less pixels to be refreshed and less computing resources and display resources consumed).

In some embodiments, the determining the display structure of the comment layer based on the height parameter value and the preset height threshold value may include: in response to determination that the height parameter value is greater than the height threshold, determining a height of the comment layer based on at least one of the following: a preset height of the comment layer, and a height of a screen on which the browsing object is displayed.

Here, the preset height of the comment layer may be a height value that is preset according to the actual application scenario, and the value is not limited herein.

Here, if the height parameter value is greater than the height threshold, the size of the comment layer is determined according to a size of the screen. For example, the determined height of the comment layer may be approximately equal to the height of the screen or slightly smaller than the height of the screen. In this way, the comment layer can be displayed as large as possible within the allowable range of the screen, so that the comment layer can carry a large number of comments at a time, thereby increasing the number of comments that users can view at a time, that is, increasing information display efficiency.

In some embodiments, the above step 102 may include: in response to determination that the number of the comment is less than a preset number threshold, determining a size of the comment layer based on an area occupied by displaying the comment.

In some embodiments, the above predefined display parameter may include the number of the comment.

Here, the value of the above preset number threshold may be set according to an actual situation, which is not limited here.

Here, the area occupied by the display comment may be estimated by the above executive body.

In some embodiments, the area occupied by the comment may be determined based on content of the comment and a unit display size of the comment.

Here, the area occupied by a single comment may include one or more unit display sizes. The unit display size may be a size of a unit measuring the displayed comment. For example, the unit display size may indicate an area occupied by a single word when the comment is displayed. For example, the unit display size of the above comment may indicate an area occupied by a single line when the comment is displayed.

Here, the area occupied by each comment may be determined based on the unit display size and the content of the comment. Then, areas occupied by respective comments are added to determine the area occupied by the displayed comment, and the area occupied by the comment is determined as the size of the comment layer.

It is to be noted that, if the number of the comment is less than the preset number threshold, the area of the screen occupied by the displayed comment may be small, that is, in a case that the area occupied by the displayed comments is small, a comment layer having a smaller size is generated, so as to ensure that the comment can be displayed completely while reducing the screen area occupied by displaying the comment, thereby improving the utilization rate of the screen, and reducing the resources consumed by screen refresh (a smaller second region for displaying the comment corresponds to less pixels to be refreshed and less computing resources and display resources consumed).

In some embodiments, the above step 102 may include: in response to determination that the number of the comment is not less than a preset number threshold, determining a size of the comment layer based on a size of a screen on which the browsing object is displayed.

Here, the size of the comment layer is determined based on the size of the screen on which the browsing object is displayed, which may be implemented in various ways, which are not limited here.

In some application scenarios, in a case that the number of the comment is not less than the preset number threshold, the number of comment may be large, and the size of the comment layer is determined based on the size of the screen on which the browsing object is displayed, such that the size of the comment layer matches the size of the screen. That is, a height of the comment layer may be the same as a height of the screen, and a width of the comment layer may be smaller than a width of the screen.

It is to be noted that in a case that the number of the comment is not less than the preset number threshold, the size of the comment layer is determined based on the size of the screen, such that the comment layer can be displayed as large as possible within the allowable range of the screen. In this way, the comment layer may carry a greater number of comments at a time, thereby increasing the number of comments that can be viewed by a user at a time, that is, improving the efficiency of information display.

In some embodiments, the above comment layer may include at least one comment unit. Here, the above comment unit is configured to display a single comment, and the comment unit may include at least one of, but is not limited to: a comment display region, a commenter identification display region, a commenting time display region, and a region for displaying feedback information for the comment.

Here, the above comment display region may be configured to display the comment.

Here, the above commenter identification display region may be configured to display an identification of a commenter that sends the comment.

Here, the above commenting time display region may be configured to display time when the comment is sent.

Here, the above region for displaying feedback information for the comment may be configured to display feedback information for the comment. Here, the feedback information may also be referred to as reply information, that is, the feedback information is a replay to the comment information.

It is to be noted that the above comment layer includes at least one comment unit for separately displaying different comments, such that the user can distinguish between different comment information when browsing the comment information, so as to avoid misunderstanding due to the mixing of different comment information, thereby reducing the time for the user to understand the comment information and improving the browsing efficiency of the user, and improving the display efficiency of the comment. Further, consumption of computing resources and display resources caused by displaying the comment is reduced.

It is to be noted that the comment unit may include the above various regions, and may prompt relevant information of the comment (for example, the commenter identification, the commenting time and the feedback information) for the comment. In this way, the user can obtain the above related information when browsing the comment, which saves the user's time and calculation amount for searching for the above related information, thereby increasing the information amount of the comment-related information obtained by the user in a unit time, that is, improving the browsing efficiency of the user and the display efficiency of the comment, such that consumption of computing resources and display resources caused by displaying the comment can be reduced.

In some embodiments, the above method further includes: determining a comment in a selected state according to a browsing operation performed by a user in the comment layer; determining commented content targeted by the comment in the selected state as first target commented content; and switching a display position of the browsing object to the first target commented content, and displaying the first target commented content.

Here, the browsing operation in the comment layer may be used to move the content in the comment layer, so that the user can view and browse the comment.

Here, the determining the comment in the selected state may be implemented in various ways, which are not limited here.

In some application scenarios, each comment may have a separate display region, and each comment may be selected. For example, if the user clicks on a display region of a certain comment, the comment may be selected, that is, the comment is in the selected state.

In some application scenarios, a comment near the middle of the first region may be determined as the comment in the selected state.

Here, the comment may be for commented content. The commented content targeted by the comment in the selected state may be referred to as the first target commented content.

Here, the switching the display position of the browsing object to the first target commented content, and displaying the first target commented content may be understood as, with the progress of the browsing operation, the comment in the selected state may change, and the first target commented content may also change; when the comment (in the selected state) displayed in the second region changes, the comment displayed in the first region may be changed to the changed first target commented content accordingly. In other words, the commented content displayed in the first region may change as the comment displayed in the second region changes, ensuring that the commented content displayed in the first region is the commented content targeted by the currently displayed comment.

It is to be noted that the browsing object in the first region and the comment layer may be seen on the same screen at the same time, and when the comment displayed in the comment layer changes, the commented content of the browsing object changes accordingly. In other words, the browsing object under the comment layer and the comment layer may be seen on the same screen. During the scrolling process of the comment layer, the text of the browsing object is viewable at the same time to ensure that the context can be obtained. In this way, it can be ensured that the user can see the commented content targeted by the comment when the user is informed of the comment, eliminating a step of operating the first region to search for the commented content targeted by the comment by the user, thereby improving the information display efficiency, and saving the calculation amount caused by searching by the user.

In some embodiments, the above first target commented content is displayed in association with a target indicator.

Here, the target indicator is configured to highlight content displayed in association with the target indicator. The above target indicator may be configured to indicate target content, to highlight the target content.

Here, the implementation manner of the target indicator may be set according to the actual application scenario, which is not limited here.

For example, the above target indicator may include, but is not limited to, at least one of: a highlight color block, a preset image, and the like.

In some application scenarios, the commented content targeted by the comment currently displayed in the comment layer may be displayed in association with the target indicator. In other words, following the update of the comment in the comment layer, the target indicator may be transferred among commented content indicated by comments successively in the selected state. Here, the target indicator may be a yellow image, a shaded image, or the like, and may alternatively be an indicator, a changed font, or the like, which is not limited herein.

Figure 3A:
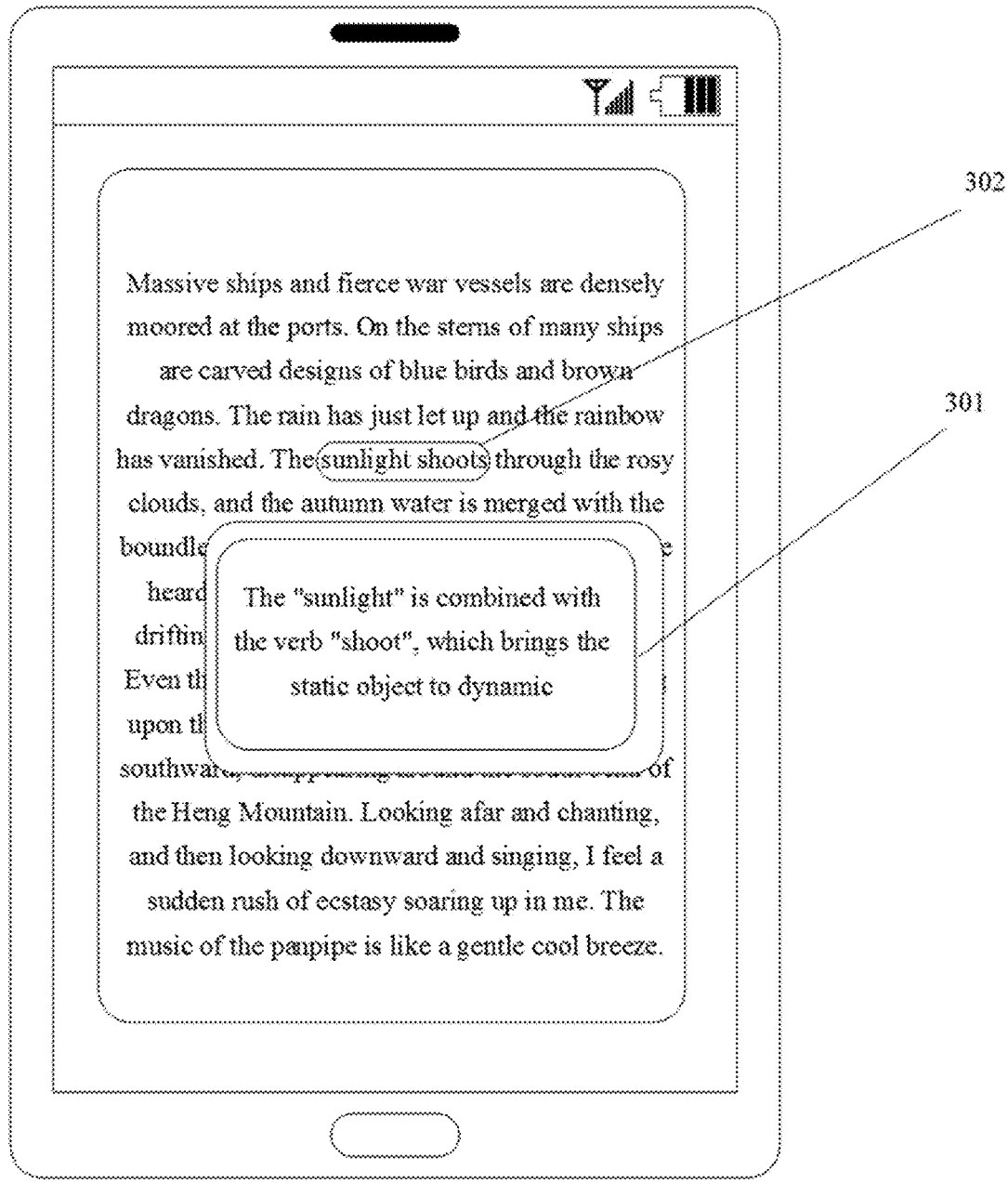
FIGS. 3A and 3B are schematic diagrams of another application scenario of the display method according to the present disclosure.
Figure 3B:
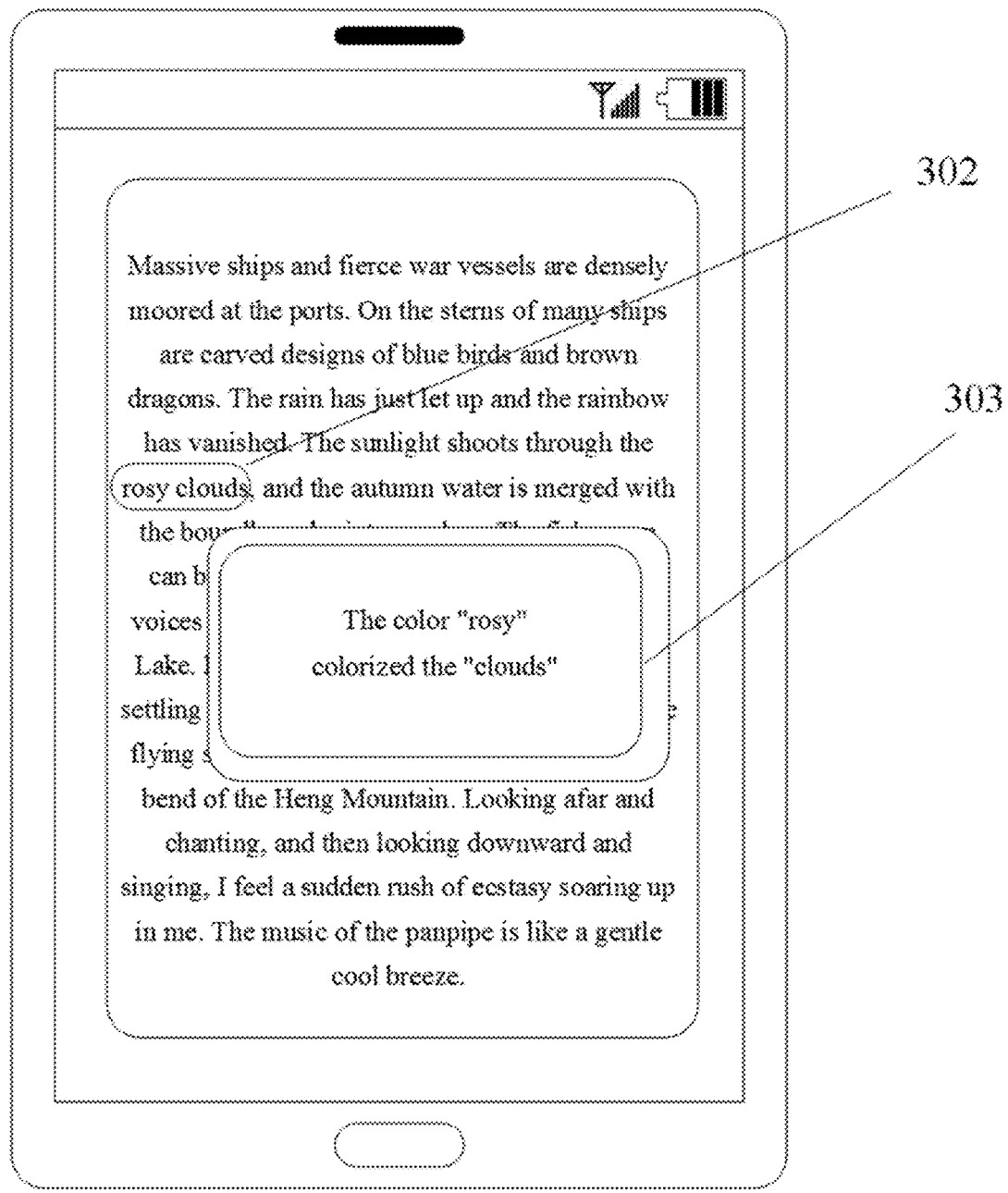

For example, the browsing object includes "The sunlight shoots through the rosy clouds". The commented content targeted by a first selected comment is "sunlight shoots", and the commented content targeted by the comment that is subsequently in the selected state is "rosy clouds". The target indicator may be transferred from "sunlight shoots" to "rosy clouds". Reference is made to FIGS. 3A and 3B. In FIG. 3A, the comment 301 is for the commented content "sunlight shoots", and "sunlight shoots" is circled with a target indicator 302. In FIG. 3B, the comment 303 is for the commented content "rosy clouds", and "rosy clouds" is circled by the target indicator 302.

It is to be noted that, with the target indicator, the user can be prompted with the position of the commented content targeted by the current comment in the browsing object, so that the speed of the user obtaining the commented content targeted by the comment can be improved, thereby improving the user's browsing efficiency. In some embodiments, the content targeted by the comment in the browsing object may be referred to as the commented content.

For example, the browsing objects include "The sunlight shoots through the rosy clouds". The comment may include a comment for "sunlight shoots", and "sunlight shoots" may be referred to as the commented content.

In some embodiments, the above method may further include: in response to detection of a predefined update operation, updating the comment displayed in the comment layer.

Here, content of the predefined update operation may be set according to the actual situation, and is not limited here.

For example, an update control may be displayed in the comment layer, and a click operation performed by the user on the update control may serve as the predefined update operation.

For example, a sliding operation that has a range greater than a preset distance and that is performed by the user on the comment layer may serve as the predefined update operation.

In some application scenarios, the size of the comment layer may match the size of the screen, but the number of comments is large. In this case, the comment layer cannot display all comments at one time. Therefore, an update operation may be predefined to provide the user with a method for updating comments.

It is to be noted that, by updating the comments displayed in the comment layer, the user may be provided with a method to obtain all the comments, and by updating the comments in the comment layer with the update operation, the utilization rate of the comment layer can be improved. That is, by replacing content, the number of comments displayed in the comment layer within a time period is increased.

In some embodiments, the above method further includes: in response to determination that commented content targeted by the comment after the updating is different from commented content targeted by the comment before the updating, displaying the commented content targeted by the comment after the updating.

For example, the browsing object includes "The sunlight shoots through the rosy clouds". If the commented content targeted by the comment before the updating is "sunlight shoots", and the commented content targeted by the comment after the updating is "rosy clouds", the commented content "rosy clouds" targeted by comment after the updating is displayed.

It is to be noted that the browsing object in the first region and the comment layer may be seen on the same screen at the same time, and the commented content of the browsing object is also changed during the update process of the comment displayed on the comment layer. In other words, the browsing object under the comment layer and the comment layer may be seen on the same screen. During the scrolling process of the comment layer, the text of the browsing object is viewable at the same time to ensure that the context can be obtained. In this way, it can be ensured that the user can see the commented content targeted by the comment when the user is informed of the comment, eliminating a step of operating the first region to search for the commented content targeted by the comment by the user, thereby improving the information display efficiency, and saving the calculation amount caused by searching by the user.

In some embodiments, the above method may further include: in response to detection of a predefined reply operation, displaying a comment input control; obtaining a message for commented content or for the comment by using the comment input control; displaying the obtained message in association with the comment or the commented content targeted by the message according to preset message display sequence information.

Here, the content of the predefined reply operation may be set according to the actual situation, and is not limited here. For example, the comment layer may be provided with a reply control, and a click operation performed by the user on the reply control may serve as a reply operation. For example, a predefined gesture operation performed by the user on the screen (for example, an operation of drawing a preset letter) may serve as the reply operation.

Here, the above comment input control may be configured to receive comment information, and the type of comment information is not limited here. For example, the type of the above comment information may be text information, picture information or voice information.

Here, the above preset message display sequence information may indicate a sequence in which messages are displayed. For example, the message display sequence information may indicate that comments of the same commented content are arranged from top to bottom in the comment layer in chronological order.

In some application scenarios, the comment displayed in the comment layer may be set to a selected state or a non-selected state. If the comment is in the selected state, the predefined reply operation is triggered, and the comment inputted by using the comment input control may be for the comment in the comment layer, or for the commented content corresponding to the comment currently in the selected state.

It is to be noted that, in the above method, a method for a user to reply when viewing the comment, and a method to display the comment information provided by the user are provided, thereby providing a convenient interaction method and improving the interaction efficiency for browsing object. In some embodiments, the above method may further include determining whether to display a comment for the browsing object.

In some embodiments, the above method may further include: in response to detection of a triggering operation for a notification message control, displaying a notification message. Here, the above notification message may include the comment.

Here, the notification message control may respond to user triggering, and the execution body may display the notification message in response to detection that the notification message control is triggered.

Here, the above notification message may include, but is not limited to, at least one of: a comment, a friend message, and a system message. Here, the friend message may be a message sent by a user who has established an association relationship with the user in advance. The above system message may be a message sent by a server having a communication connection with the above executive body.

Here, the notification message control may be displayed in various functional interfaces. For example, the browsing message control may be displayed in an interface displaying the browsing object.

Here, the above notification message control may be displayed in various forms, which are not limited here. For example, the notification message control may be displayed in a shape of a bell.

In some embodiments, the above method may further include: in response to detection of a viewing operation for the comment in the notification message, displaying the comment for the browsing object.

In some application scenarios, messages in the above notification message may be arranged according to the receiving time of the messages, and various types of messages in the notification message are displayed together. In other words, comments may be mixed with friend messages and system messages.

Here, the above viewing operation may be used to view details of the comment. Here, the above viewing operation may be implemented in various manners, such as clicking on the comment, sliding left and right in the display region of the comment, and the like, which are not limited herein.

Here, after it is determined that the comment for the browsing object is displayed, the executing subject may generate an execution of displaying the comment for the browsing object. The above executive body may determine the display structure of the comment layer in response to the above instruction. It should be understood that the above displaying the comment for the browsing object may include displaying the comment for the browsing object in the comment layer.

It is to be noted that, through the notification message control provided above and the viewing operation for the comment in the notification message, an interface for displaying comment information may be entered. In this way, the comment may be displayed in a centralized manner in the comment layer, the efficiency of users viewing comments is improved, the time for users to view comments is shortened, and the computing resources and power consumption of the execution bodies consumed by displaying comment are reduced.

In some embodiments, the displaying the comment for the browsing object in response to detection of the viewing operation for the comment in the notification message may include: determining commented content targeted by the comment targeted by the viewing operation as second target commented content; and the method may further include: switching a display position of the browsing object to the second target commented content, and displaying the second target commented content and the comment targeted by the viewing operation.

Here, the comment targeted by the viewing operation may be determined as a target comment, and the commented content targeted by the target comment may be determined as the second target commented content.

Here, the display position of the browsing object is switched to the second target commented content, and the second target commented content is displayed.

In other words, the displayed second target commented content has an association with the comment targeted by the target viewing operation, and is displayed in association with the comment targeted by the target viewing operation. In this way, when the comment targeted by the viewing operation is displayed in the comment layer, the commented content targeted by the comment is displayed in association with the comment, so as to provide the user with the basis of the comment, eliminating an operation performed by the user to search for the commented content targeted by the currently displayed comment, and saving the computing resources and the power of the execution body consumed due to the searching operation.

In some embodiments, the displaying the second target commented content and the comment targeted by the viewing operation may include: displaying the second target commented content in association with a target indicator.

Here, the above target indicator may be configured to indicate the target content, to highlight the target content.

Here, the implementation manner of the target indicator may be set according to the actual application scenario, and is not limited here.

For example, the above target indicator may include, but is not limited to, at least one of: a highlight color block, a preset image, and the like.

It should be noted that, through the target indicator, the user can be prompted with a position of the commented content targeted by the current comment in the browsing object, so that the speed of the user obtaining the commented content targeted by the comment and the browsing efficiency of the user can be improved.

In some embodiments, the content targeted by the comment in the browsing object is the commented content.

In some embodiments, the above method may further include: displaying the commented content in the browsing object in association with a comment prompt control; in response to detection of a triggering operation for the comment prompt control, displaying comment information of the commented content associated with the comment prompt control.

Here, the above comment prompt control may be configured to prompt that a part of the content of the browsing object has a comment. Further, the above comment prompt control may respond to a user operation.

Here, a form and a position of the comment prompt control may be set according to the actual situation, and are not limited here.

For example, the above comment prompt control may be arranged at an upper right of the commented content.

For example, the above comment prompt control may be arranged on the right side of the browsing object, and point to the commented content through an indicator (for example, an arrow).

It is to be noted that, by displaying the comment prompt control associated with the commented content when displaying the browsing object, the user can directly trigger to display the comment for the concerned commented content, thereby improving the user's efficiency to obtain the comment, and improving the efficiency of interaction.

In some application scenarios, the number of the comment may be displayed on the above comment prompt control.

In this way, the user can be prompted with the number of the comment for each commented content, such that the user can be prompted with the popularity of the commented content. Therefore, it is convenient for the user to determine whether to view the comment for the commented content according to the popularity of the commented content, that is, the user can quickly determine the key commented content in each browsing object through the number of the comment for the commented content, so as to help the user to obtain key content in a short period of time, improve the user's browsing efficiency, and reducing aimless operations of the user when the user cannot determine the key points.

Figure 4:
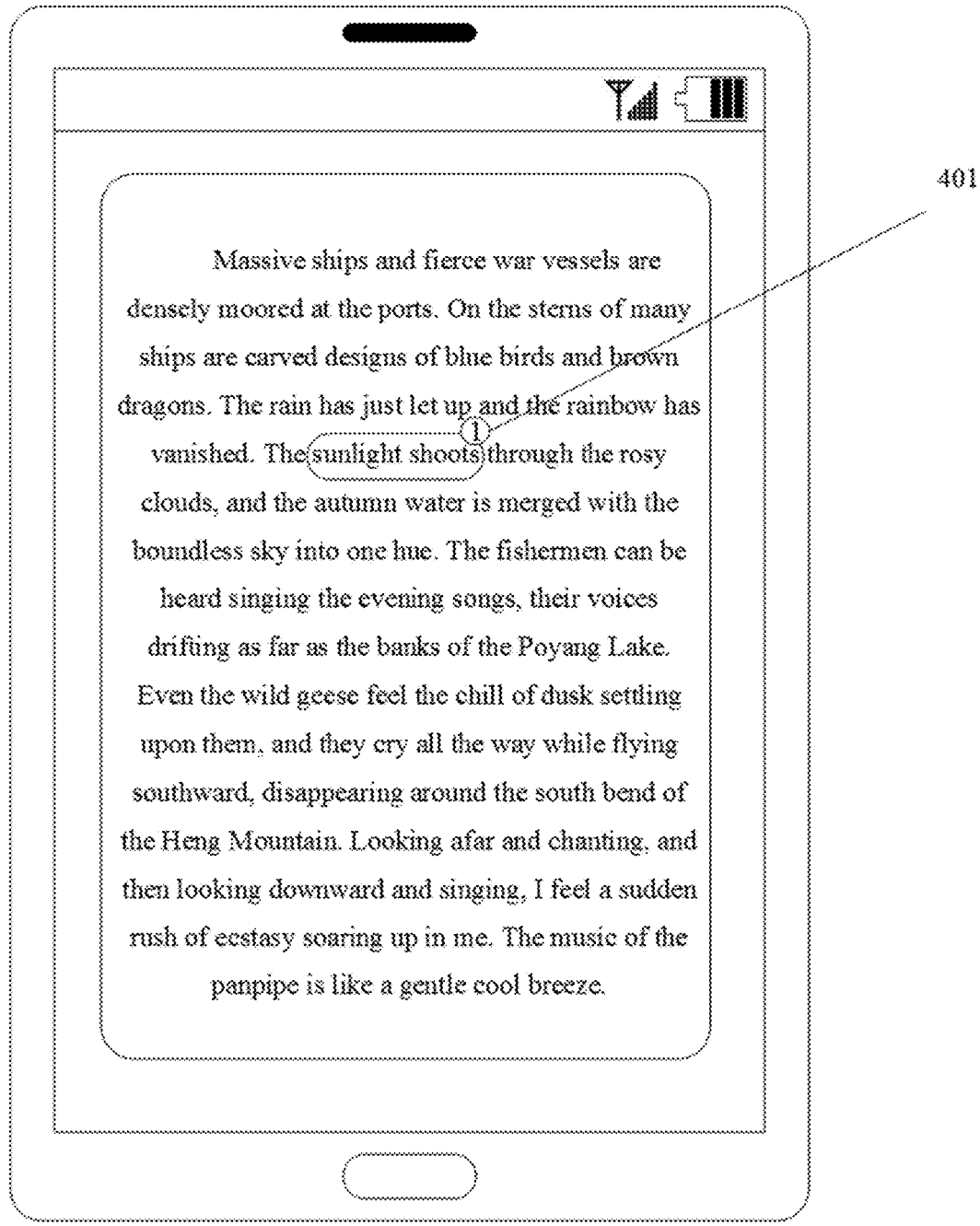
FIG. 4 is a schematic diagram of another application scenario of the display method according to the present disclosure.

Referring to FIG. 4, a comment prompt control 401 is shown. For example, the comment prompt control shown in FIG. 4 includes a box surrounding "sunlight shoots" and the number of the comment (that is, the number 1 in the circle).

Figure 5:
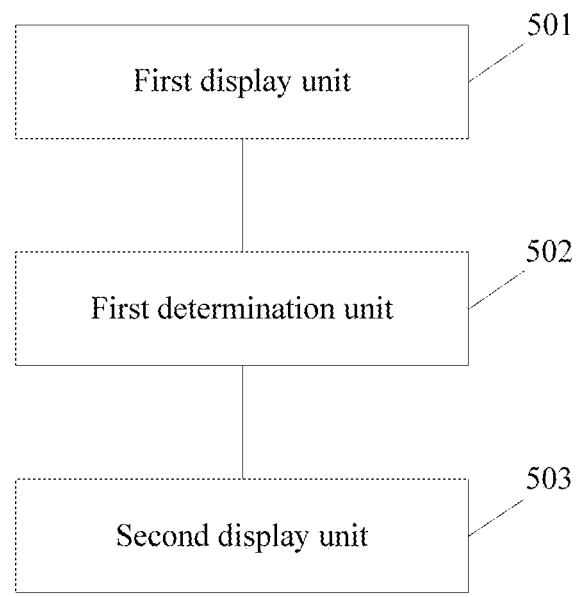
FIG. 5 is a schematic structural diagram of a display apparatus according to an embodiment of the present disclosure.

Referring to FIG. 5, as an implementation of the methods shown in the above figures, a display apparatus is provided according to an embodiment of the present disclosure, which corresponds to the method embodiment shown in FIG. 1. The apparatus is applicable in various electronic devices.

As shown in FIG. 5, the display apparatus according to this embodiment includes a first display unit 501, a first determination unit and a second display unit 503. The first display unit is configured to display a browsing object in a first region. The first determination unit is configured to determine, in response to an instruction to display a comment for the browsing object, a display structure of a comment layer based on a predefined display parameter of the comment for the browsing object, where the predefined display parameter is configured to indicate a size of a second region in which the comment layer is located. The second display unit is configured to generate the comment layer based on the determined display structure, and display the comment in the generated comment layer, where the second region overlaps with the first region, and a range of the second region is smaller than a range of the first region in a first direction or a second direction.

In this embodiment, for processing of the first display unit 501, the first determination unit 502 and the second display unit 503 of the display apparatus and technical effects thereof, reference may be respectively made to related description of steps 101, 102 and 103 in the corresponding embodiment shown in FIG. 1, which is not described in detail here.

In some embodiments, the predefined display parameter includes a height value of the comment; and the determining the display structure of the comment layer based on the predefined display parameter of the comment for the browsing object includes: obtaining a height value of each of the comment for the browsing object, and obtaining a height parameter value based on a sum of the height value; and determining the display structure of the comment layer based on the height parameter value and the preset height threshold.

In some embodiments, the determining the display structure of the comment layer based on the height parameter value and the preset height threshold includes: determining the height value of the comment layer based on the height parameter value, in response to determination that the height parameter value is not greater than the height threshold.

In some embodiments, the determining the display structure of the comment layer based on the height parameter value and the preset height threshold includes: determining a height of the comment layer based on a height of a screen on which the browsing object is displayed, in response to determination that the height value is greater than the height threshold.

In some embodiments, the predefined display parameter includes the number of the comment; and the determining the display structure of the comment layer based on the predefined display parameter of the comment for the browsing object includes: determining a size of the comment layer based on an area occupied by displaying the comment, in response to determination that the number of the comment is less than a preset number threshold.

In some embodiments, the determining the display structure of the comment layer based on the predefined display parameter of the comment for the browsing object includes: determining a size of the comment layer based on a size of a screen on which the browsing object is displayed, in response to determination that the number of the comment is not less than a preset number threshold.

In some embodiments, the comment layer includes at least one comment unit, where the comment unit is configured to display a single comment, and the comment unit includes at least one of: a comment display region, a commenter identification display region, a commenting time display region, and a region for displaying feedback information for the comment.

In some embodiments, content targeted by the comment in the browsing object is commented content; and the apparatus is further configured to: determine a comment in a selected state according to a browsing operation performed by a user in the comment layer, determine commented content targeted by the comment in the selected state as first target commented content; and switch a display position of the browsing object to the first target commented content, and display the first target commented content.

In some embodiments, the apparatus is further configured to display the first target commented content in association with a target indicator, where the target indicator is configured to highlight content displayed in association with the target indicator.

In some embodiments, the apparatus is further configured to update the comment displayed in the comment layer in response to detection of a predefined update operation; and display commented content targeted by the comment after updating in response to determination that the commented content targeted by the comment after the updating is different from the commented content targeted by the comment before the updating.

In some embodiments, the apparatus is further configured to display a comment input control in response to detection of a predefined reply operation; obtain a message for commented content or for the comment by using the comment input control; and displaying the obtained message in association with the comment or the commented content targeted by the message according to preset message display sequence information.

In some embodiments, the apparatus is further configured to displaying a notification message in response to detection of a triggering operation for a notification message control, where the notification message includes the comment; and display the comment for the browsing object in response to detection of a viewing operation for the comment in the notification message.

In some embodiments, the displaying the comment for the browsing object in response to detection of the viewing operation for the comment in the notification message includes: determining commented content targeted by the comment targeted by the viewing operation as second target commented content; and the apparatus is further configured to: switch a display position of the browsing object to the second target commented content, and display the second target commented content.

In some embodiments, the displaying the second target commented content includes: displaying the second target commented content in association with a target indicator, where the target indicator is configured to highlight content that is displayed in association with the target indicator.

In some embodiments, content that is in the browsing object and that is targeted by the comment is commented content; and the apparatus is further configured to: display the commented content in the browsing object in association with a comment prompt control; and display a comment for the commented content associated with the comment prompt control in response to detection of a triggering operation for the comment prompt control.

In some embodiments, the apparatus is further configured to display, on the comment prompt control, the number of the comment for the commented content, where the number of the comment indicates the number of the comment for the commented content associated with the comment prompt control.

Figure 6:
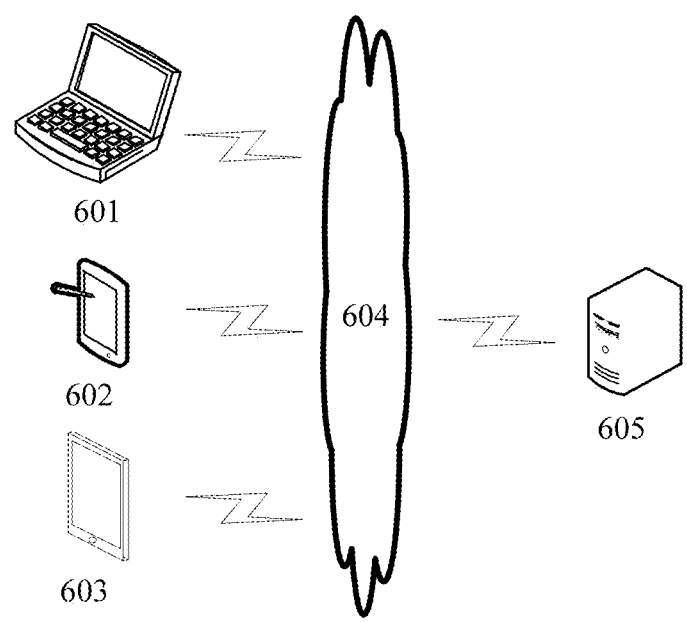
FIG. 6 illustrates an exemplary system architecture in which a display method according to an embodiment of the present disclosure is applicable.

Reference is made to FIG. 6, which illustrates an exemplary system architecture in which the display method according to the embodiments of the present disclosure is applicable.

As shown in FIG. 6, the system architecture may include terminal devices 601, 602, and 603, a network 604, and a server 605. The network 604 is a medium configured to provide a communication link between the terminal devices 601, 602, 603 and the server 605. The network 604 may include various connection types, such as wired communication links, wireless communication links, or fiber optic cables, and the like.

The terminal devices 601, 602, 603 may interact with the server 605 through the network 604 to receive or send messages and the like. Various client applications may be installed on the terminal devices 601, 602 and 603, such as web browser applications, search applications, and news applications. The client applications in the terminal devices 601, 602, and 603 may receive instructions from users, and perform corresponding functions according to the instructions from the users, such as adding information to another piece of information according to the instructions from the users.

The terminal devices 601, 602, and 603 may be implemented by hardware or software. In a case that the terminal devices 601, 602, and 603 are implemented by hardware, they may be various electronic devices that each has a display screen and supports web browsing, including but not limited to smart phones, tablet computers, e-book readers, MP3 (Moving Picture Experts Group Audio Layer III) players, MP4 (Moving Picture Experts Group Audio Layer IV) players, laptop portable computers, desktop computers, and the like. In a case that the terminal devices 601, 602, and 603 are implemented by software, they may be installed in the electronic devices listed above. The terminal devices 601, 602, and 603 each may be implemented as multiple software or software modules (for example, software or software modules for providing distributed services), or may be implemented as a single software or software module, which is not limited here.

The server 605 may be a server that provides various services, for example, receiving information obtaining requests sent by the terminal devices 601, 602, and 603, obtaining display information corresponding to the information obtaining requests in various ways in response to the information obtaining requests, and sending related data of the display information to the terminal devices 601, 602 and 603.

It is to be noted that the display method according to the embodiments of the present disclosure may be executed by a terminal device, and correspondingly, the display apparatus may be provided in the terminal devices 601, 602, and 603. In addition, the display method according to the embodiments of the present disclosure may alternatively be executed by the server 605, and correspondingly, the display apparatus may be provided in the server 605.

It should be understood that the numbers of terminal devices, the network and the server in FIG. 6 are merely illustrative. Any number of terminal devices, networks and servers may be provided according to implementation needs.

Figure 7:
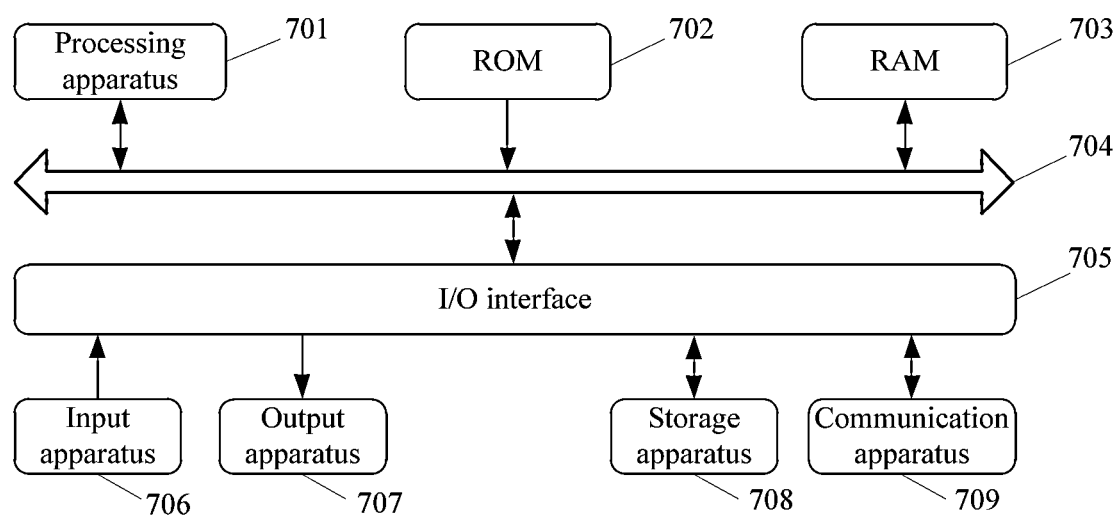
FIG. 7 is a schematic diagram of a basic structure of an electronic device according to an embodiment of the present disclosure.

Reference is made to FIG. 7, which is a schematic structural diagram of an electronic device (for example, the terminal device or the server in FIG. 5) suitable for implementing the embodiments of the present disclosure. The terminal device in the embodiments of the present disclosure may include, but is not limited to, a mobile terminal such as a mobile phone, a notebook computer, a digital broadcast receiver, a PDA (a personal digital assistant), a PAD (a tablet), a PMP (a portable multimedia player), a vehicle-mounted terminal (for example, an in-vehicle navigation terminal), and the like, and a stationary terminal such as a digital TV, a desktop computer, and the like. The electronic device shown in FIG. 7 is only an example, and should not impose any limitation on the function and scope of use of the embodiments of the present disclosure.

As shown in FIG. 7, the electronic device may include a processing apparatus 701, such as a central processing unit or a graphics processor, which can execute various appropriate actions and processes based on a program stored in a Read Only Memory (ROM) 702 or a program loaded from a storage apparatus 708 into a Random Access Memory (RAM) 703. In the RAM 703, various programs and data required by the electronic device 700 for operation are further stored. The processing apparatus 701, the ROM 702, and the RAM 703 are connected to each other through a bus 704. An input/output (I/O) interface 705 is also connected to the bus 704.

Generally, the following may be connected to the I/O interface 705: an input apparatus 706 such as a touch screen, a touch pad, a keyboard, a mouse, a camera, a microphone, an accelerometer, a gyroscope, an output apparatus 707 such as a Liquid Crystal Display (LCD), a speaker, a vibrator, a storage apparatus 708 such as a magnetic tape, a hard disk, and a communication apparatus 709. Based on the communication apparatus 709, the electronic device may communicate with other devices through wired or wireless communication to exchange data. Although FIG. 7 shows the electronic device including various apparatuses, it should be understood that not all shown apparatuses are required to be implemented or included. The shown apparatuses may be replaced by other apparatuses, or more or less apparatuses may be included.

Specifically, the processes described with reference to flow charts, may be implemented as a computer software program according to an embodiment of the present disclosure. For example, a computer program product is provided according to an embodiment of the present disclosure, the computer program product includes a computer program embodied on a non-transitory computer readable medium. The computer program includes program codes for performing the method shown in the flowchart. In such embodiments, the computer program may be downloaded and installed from the network through the communication apparatus 709, installed from the storage apparatus 708, or installed from the ROM 702. The computer program, when being executed by the processing apparatus 701, performs functions defined in the method according to the embodiments of the present disclosure.

It should be noted that the computer readable medium according to the present disclosure may be a computer readable signal medium or a computer readable storage medium or any combination of the two. The computer readable storage medium may include, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a Random Access Memory (RAM), a Read Only Memory (ROM), an Erasable Programmable Read Only Memory (EPROM or a flash memory), an optical fiber, a portable Compact Disk Read-Only Memory (CD-ROM), an optical storage device, a magnetic storage device, or any suitable combination of the foregoing. In the present disclosure, the computer readable storage medium may be any tangible medium containing or storing a program, where the program may be used by an instruction execution system, apparatus or device or used in combination therewith. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable signal medium may send, transmit or transfer programs used by an instruction execution system, apparatus or device or used in combination therewith. The program codes included in the computer readable medium may be transferred through any proper medium including, but not limited to, an electric wire, an optical cable, RF (Radio Frequency), and the like, or any suitable combination of the foregoing.

In some embodiments, the client and the server may communicate with each other by using any currently known or future network protocol such as HTTP (HyperText Transfer Protocol) to communicate, and may be connected with a digital data network in any form or medium (such as a communication network). Examples of communication networks include a local area network (LAN), a wide area network (WAN), an internet (for example, the Internet), and a peer-to-peer network (such as the ad hoc peer-to-peer network), as well as any current or future networks.

The above mentioned computer-readable medium may be included in the above mentioned electronic device, or may exist alone without being assembled into the electronic device.

The above mentioned computer-readable medium carries one or more programs. The above mentioned one or more programs, when being executed by the electronic device, cause the electronic device to: display a browsing object in a first region, determine, in response to an instruction to display a comment for the browsing object, a display structure of a comment layer based on a predefined display parameter of the comment for the browsing object, where the predefined display parameter is configured to indicate a size of a second region in which the comment layer is located, generate the comment layer based on the determined display structure, and display the comment in the generated comment layer, where the second region overlaps with the first region, and a range of the second region is smaller than a range of the first region in a first direction or a second direction.

The computer program codes for performing the operations according to the present disclosure may be written in at least one programming language or a combination of the at least one programming language. The programming language includes, but is not limited to, an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowchart and block diagrams in the drawings illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the drawings. For example, two blocks shown in succession may be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform the specified functions or operations, or may be implemented by a combination of dedicated hardware and computer instructions.

The modules involved in the embodiments of the present disclosure may be implemented in a software manner, or in a hardware manner. The name of the modules does not constitute a limitation of the modules under any circumstances. For example, the first display unit may alternatively referred to as "a unit for displaying a browsing object".

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, apparatuses, or devices, or any suitable combination of the foregoing. More specific examples of machine-readable storage media include one or more wire-based electrical connections, a portable computer disk, a hard disk, a Random Access Memory (RAM), a Read Only Memory (ROM), an Erasable Programmable Read Only Memory (EPROM or a flash memory), a optical fiber, a Compact Disk Read Only Memory (CD-ROM), an optical storage device, a magnetic storage device, or any suitable combination of the foregoing.

The above are only preferred embodiments of the present disclosure and are illustrative of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

In addition, although the operations are depicted in a specific order, it should not be understood as these operations are required to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims.

What is claimed is:

1. A display method, comprising:
   displaying a browsing object in a first region, wherein the first region displays on an online documentation;
   determining, in response to an instruction to display a comment for the browsing object, a display structure of a comment layer based on a predefined display parameter of the comment for the browsing object, wherein the predefined display parameter is configured to indicate a size of a second region in which the comment layer is located; and
   generating the comment layer based on the determined display structure, and displaying the comment in the generated comment layer, wherein a range of the second region is smaller than a range of the first region in a first direction or a second direction,
   wherein the predefined display parameter comprises a height value of the comment; and
   the determining the display structure of the comment layer based on the predefined display parameter of the comment for the browsing object comprises:
   obtaining a height value of each of the comment for the browsing object, and obtaining a height parameter value based on the height value; and
   determining the display structure of the comment layer based on the height parameter value and preset height threshold,
   wherein the obtaining the height parameter value based on the height value comprises one of:
   determining a sum of the height value as the height parameter value;
   determining a sum of height values and heights of gaps between adjacent comments as the height parameter value.

2. The method according to claim 1, wherein the second region overlaps with the first region.

3. The method according to claim 1, wherein the determining the display structure of the comment layer based on the height parameter value and the preset height threshold comprises:
   determining the height value of the comment layer based on the height parameter value, in response to determination that the height parameter value is not greater than the height threshold.

4. The method according to claim 1, wherein the determining the display structure of the comment layer based on the height parameter value and the preset height threshold comprises:
   determining a height of the comment layer based on at least one of: a preset height of the comment layer, and a height of a screen on which the browsing object is displayed, in response to determination that the height value is greater than the height threshold.

5. The method according to claim 1, wherein the predefined display parameter comprises the total number of comments; and
   the determining the display structure of the comment layer based on the predefined display parameter of the comment for the browsing object comprises:
   determining a size of the comment layer based on an area occupied by displaying the comment, in response to determination that the total number of comments is less than a preset number threshold.

6. The method according to claim 1, wherein the determining the display structure of the comment layer based on the predefined display parameter of the comment for the browsing object comprises:
   determining a size of the comment layer based on a size of a screen on which the browsing object is displayed, in response to determination that the total number of comments is not less than a preset number threshold.

7. The method according to claim 1, wherein the determining, in response to the instruction to display the comment for the browsing object, the display structure of the comment layer based on the predefined display parameter of the comment for the browsing object comprises:
   determining a display structure of a target comment layer based on a predefined display parameter of a comment for a target comment object in response to an instruction to display the comment for the target comment object in the browsing object, wherein the target comment layer is configured to display the comment for the target comment object.

8. The method according to claim 1, wherein the comment layer comprises at least one comment unit, wherein the comment unit is configured to display a single comment, and the comment unit comprises at least one of: a comment display region, a commenter identification display region, a commenting time display region, and a region for displaying feedback information for the comment.

9. The method according to claim 1, wherein content targeted by the comment in the browsing object is commented content; and
   the method further comprises:
   determining a comment in a selected state according to a browsing operation performed by a user in the comment layer, determining commented content targeted by the comment in the selected state as first target commented content; and switching a display position of the browsing object to the first target commented content, and displaying the first target commented content.

10. The method according to claim 9, further comprising: displaying the first target commented content in association with a target indicator, wherein the target indicator is configured to highlight content displayed in association with the target indicator.

11. The method according to claim 1, further comprising: updating the comment displayed in the comment layer in response to detection of a predefined update operation; and displaying commented content targeted by the comment after the updating in response to determination that the commented content targeted by the comment after the updating is different from the commented content targeted by the comment before the updating.

12. The method according to claim 1, further comprising: displaying a comment input control in response to detection of a predefined reply operation;

obtaining a message for commented content or for the comment by using the comment input control; and displaying the obtained message in association with the comment or the commented content targeted by the message according to preset message display sequence information.

13. The method according to claim 1, further comprising: displaying a notification message in response to detection of a triggering operation for a notification message control, wherein the notification message comprises the comment; and displaying the comment for the browsing object in response to detection of a viewing operation for the comment in the notification message.

14. The method according to claim 13, wherein the displaying the comment for the browsing object in response to detection of the viewing operation for the comment in the notification message comprises:

determining commented content targeted by the comment targeted by the viewing operation as second target commented content; and the method further comprises:

switching a display position of the browsing object to the second target commented content, and displaying the second target commented content.

15. The method according to claim 14, wherein the displaying the second target commented content comprises:

displaying the second target commented content in association with a target indicator, wherein the target indicator is configured to highlight content that is displayed in association with the target indicator.

16. The method according to claim 1, wherein content that is in the browsing object and that is targeted by the comment is commented content; and the method further comprises:

displaying the commented content in the browsing object in association with a comment prompt control; and displaying comment information for the commented content associated with the comment prompt control in response to detection of a triggering operation for the comment prompt control.

17. A display apparatus, comprising:
at least one processor; and at least one memory communicatively coupled to the at least one processor and storing instructions that upon execution by the at least one processor cause the apparatus to:

display a browsing object in a first region, wherein the first region displays on an online documentation;

determine, in response to an instruction to display a comment for the browsing object, a display structure of a comment layer based on a predefined display parameter of the comment for the browsing object, where the predefined display parameter is configured to indicate a size of a second region in which the comment layer is located; and generate the comment layer based on the determined display structure, and display the comment in the generated comment layer, where the second region overlaps with the first region, and a range of the second region is smaller than a range of the first region in a first direction or a second direction, wherein the predefined display parameter comprises a height value of the comment; and the determine the display structure of the comment layer based on the predefined display parameter of the comment for the browsing object comprises:

obtain a height value of each of the comment for the browsing object, and obtaining a height parameter value based on the height value; and determine the display structure of the comment layer based on the height parameter value and preset height threshold, wherein the obtaining the height parameter value based on the height value comprises one of:

determine a sum of the height value as the height parameter value;

determine a sum of height values and heights of gaps between adjacent comments as the height parameter value.

18. A computer-readable non-transitory medium storing a computer program, the program, when executed by a processor, cause the computer to display a browsing object in a first region, wherein the first region displays on an online documentation;

determine, in response to an instruction to display a comment for the browsing object, a display structure of a comment layer based on a predefined display parameter of the comment for the browsing object, wherein the predefined display parameter is configured to indicate a size of a second region in which the comment layer is located; and generate the comment layer based on the determined display structure, and displaying the comment in the generated comment layer, wherein a range of the second region is smaller than a range of the first region in a first direction or a second direction, wherein the predefined display parameter comprises a height value of the comment; and the determine the display structure of the comment layer based on the predefined display parameter of the comment for the browsing object comprises:

obtain a height value of each of the comment for the browsing object, and obtaining a height parameter value based on the height value; and determine the display structure of the comment layer based on the height parameter value and preset height threshold, wherein the obtaining the height parameter value based on the height value comprises one of:

determine a sum of the height value as the height parameter value;

determine a sum of height values and heights of gaps between adjacent comments as the height parameter value.

* * * * *